Jan. 31, 1956 W. A. RAY 2,732,860
FOUR WAY BALANCED SLIDE VALVE
Filed Nov. 24, 1950 4 Sheets-Sheet 1

INVENTOR.
WILLIAM A. RAY
BY
John Flam
ATTORNEY

Jan. 31, 1956 W. A. RAY 2,732,860
FOUR WAY BALANCED SLIDE VALVE
Filed Nov. 24, 1950 4 Sheets-Sheet 2

INVENTOR.
WILLIAM A. RAY
BY John Flam
ATTORNEY

Jan. 31, 1956 W. A. RAY 2,732,860
FOUR WAY BALANCED SLIDE VALVE
Filed Nov. 24, 1950 4 Sheets-Sheet 3

INVENTOR.
WILLIAM A. RAY
BY
John Flam
ATTORNEY

Jan. 31, 1956        W. A. RAY        2,732,860
FOUR WAY BALANCED SLIDE VALVE
Filed Nov. 24, 1950        4 Sheets-Sheet 4

INVENTOR.
WILLIAM A. RAY
BY
John Flam
ATTORNEY

United States Patent Office 2,732,860
Patented Jan. 31, 1956

2,732,860

FOUR WAY BALANCED SLIDE VALVE

William A. Ray, North Hollywood, Calif., assignor to General Controls Co., a corporation of California Application November 24, 1950, Serial No. 197,209

10 Claims. (Cl. 137—623)

This invention relates to hydraulically operated slide valves adapted to function at very high pressures.

A valve of this character is described and claimed in an application filed on June 29, 1950, in the name of William A. Ray, under Serial No. 171,071, now Patent No. 2,669,417, and entitled: "Balanced Slide Valve for High Hydraulic Pressures." This application is a continuation in part of said earlier application.

The fluid usually controlled by the valve is oil; and, for such purposes as remote control of aircraft parts, the oil controlled by the valve may have a pressure of from 3000 to 5000 pounds per square inch.

It is one of the objects of this invention to provide an improved valve of this character, and particularly to utilize the pressure of the medium for operating the valve.

It is another object of this invention to make it possible to operate the valve from a remote point, as by the aid of pilot valves that are electromagnetically operated.

It is still another object of this invention to provide a four-way valve of this character, which is simple in structure and effective in operation.

This invention possesses many other advantages, and has other objects which may be made more clearly apparent from a consideration of several embodiments of the invention. For this purpose there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings.

Figure 1:
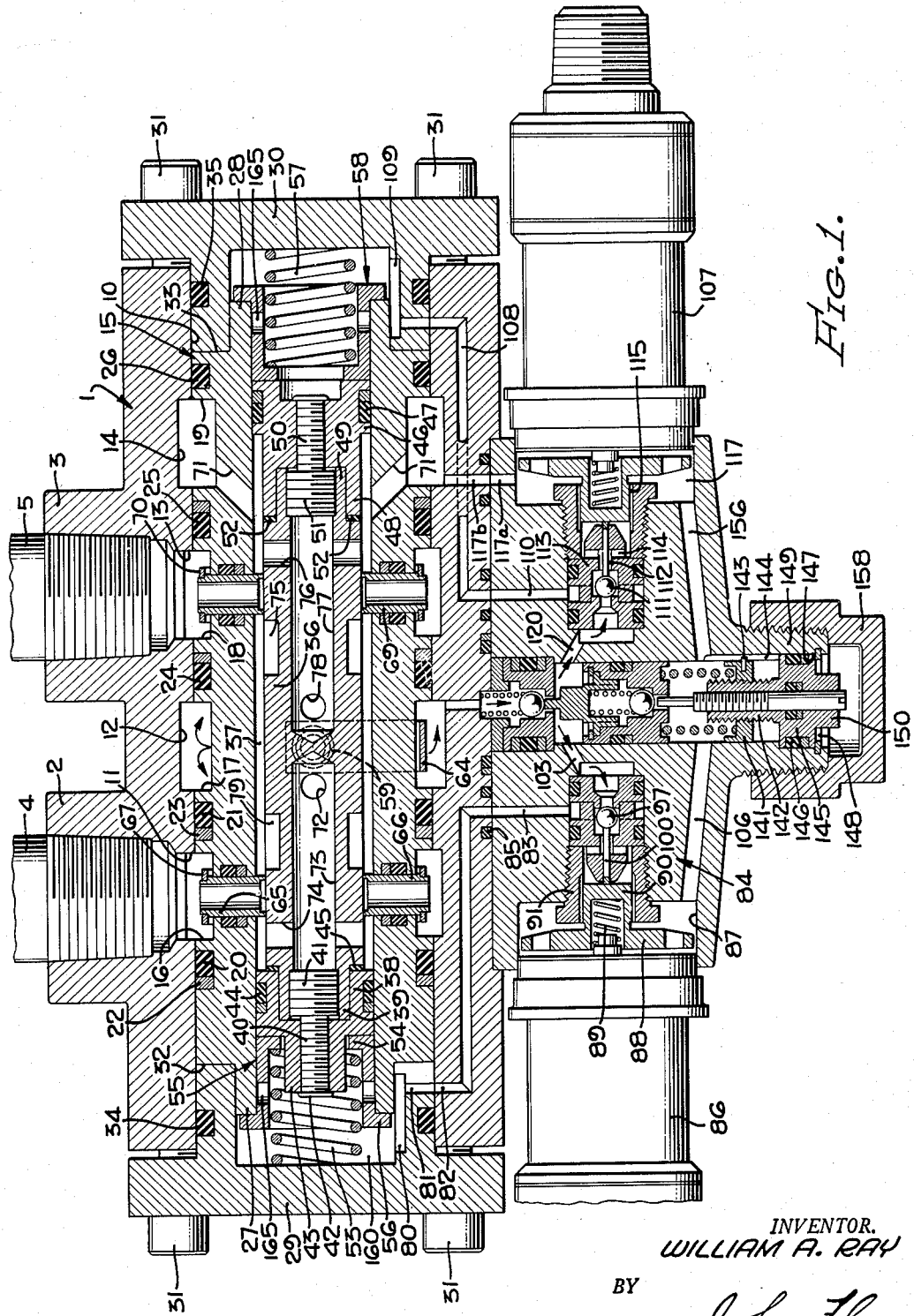
Figure 1 is a vertical section of a slide valve incorporating the invention, the parts being shown in neutral position.

An outer housing 1 is provided for the valve. This housing may most conveniently be made as a casting. It is provided with internally threaded bosses 2 and 3 for the accommodation of the conduits 4 and 5. These conduits are intended to conduct a liquid, such as oil, under high pressure to cylinders, or to exhaust the liquid from these cylinders.

The liquid under pressure enters the housing by way of a conduit 6 (Fig. 4) threaded into a hollow boss 7. An exhaust conduit 8 may be connected to a return reservoir, and is threaded into a hollow boss 9.

The valve structure is so arranged that, optionally, oil under high pressure can be supplied to one cylinder by way of conduit 4, while another cylinder is connected to the exhaust 8. In an alternative position, the other cylinder is supplied with oil under high pressure through conduit 5, and the first cylinder is connected to the exhaust conduit 8. In the neutral position of Fig. 1, communication is interrupted to both of the cylinders, and the inlet conduit 6 is closed.

The housing 1 is provided with a bore 10 that extends longitudinally therethrough. This bore 10 is interrupted by a plurality of longitudinally spaced annular grooves. One groove 11 (Figs. 1, 2, and 4) is in communication with the interior of the hollow boss 2, and thus connects with conduit 4. A second groove 12 is in communication with the interior of boss 7, and thus connects with inlet conduit 6, as shown most clearly in Fig. 4. A third groove 13 is in communication with the interior of the boss 3 for connection to the conduit 5. Lastly, there is a groove 14 which, as shown most clearly in Fig. 4, communicates with the interior of the hollow boss 9 to which the exhaust conduit 8 is connected. These grooves thus form passageways for conducting the liquid to and from the conduits 4 and 5, as well as for providing appropriate passageways for ingress of the liquid through conduit 6 and the egress of the liquid from conduit 8.

An inner valve body 15 is disposed within the housing 1. It has an exterior cylindrical surface interfitting within the bore 10. Aligned with the annular groove 11 is a corresponding groove 16 on the body 15. Similar grooves 17, 18, and 19 cooperate, respectively, with the grooves 12, 13, and 14 to define the annular passageways. Furthermore, on each side of the groove 16, recesses are provided for the accommodation of the sealing rings 20 and 21. These sealing rings may be in the form of resilient rubber rings, usually referred to as O-rings. Appropriate backing rings 22 and 23 may be provided in the ring grooves.

Similar ring structures 24 and 25 are disposed, respectively, between grooves 17 and 18 and between grooves 18 and 19. An end ring 26 is disposed to the right of groove 19. By the aid of these ring structures, the various oil passageways are properly sealed off from each other.

The body 15 is provided with reduced ends 27 and 28 which telescope into the end heads 29 and 30. These heads in turn telescope into the bore 10, and are attached to the housing 1, as by the aid of the cap screws 31. The inner ends of these heads 29 and 30 engage the shoulders 32 and 33, respectively formed at the ends of the body 15. Furthermore, sealing rings 34 and 35 extend in grooves in the heads 29 and 30.

The slide valve structure includes the slide 36 that extends longitudinally within the chamber 37 formed in the body 15. This chamber 37 is shown, in this instance, as cylindrical, and the slide 36 is of generally rectangular configuration, providing flat surfaces. These flat surfaces form seats for various port-defining means, such as will be hereinafter described.

The slide 36 is guided for longitudinal movement in the cylindrical walls of the chamber 37 by the provision of cylindrical guiding members or pistons, at the ends of slide 36. Thus a piston 38 telescopes over the reduced end 39 of the slide 36. It is attached to this reduced end by the aid of a stud 40 joined to an extension 43 of the piston 38, as by being threaded therein. The left-hand end of the stud 40 may be upset, as indicated at 42, for firmly attaching the stud to the piston.

The inner end of the stud 40 is formed as an enlarged threaded member 41 engaging interior threads in the extension 39. A resilient sealing ring structure 44 extends in a groove provided on piston 38, and a gasket washer 45 is disposed between the contiguous surfaces of the piston 38 and the slide 36.

A piston 46 is provided at the right-hand end of the slide 36. This piston similarly is provided with the sealing ring structure 47. It has an extension 48 telescoping over the cylindrical extension 49 of the slide 36. A stud 50 is firmly fastened to the piston 46, and has an enlarged inner end 51 in threaded engagement with the interior of the extension 49. A gasket washer 52 is disposed between the contiguous surfaces of the extension 48 and the slide 36.

Resilient means are provided for urging the slide 36 to the neutral position illustrated in Fig. 1. Thus, at the left-hand end, a compression spring 53 is interposed between the end wall of head 29 and the flange 54 of a spring cage 55. This spring cage is cylindrical and telescopes within the chamber 37. It has an end flange 56 restricting movement of the slide 36 to the left. When the slide 36 moves a sufficient amount, the end flange 56 contacts the inner surface of the head 29.

At the right-hand end, a compression spring 57 is similarly arranged, and urges cage 58 inwardly against the end of the piston 46. The two compression springs 53 and 57 urge the slide 36 to an intermediate or central position in which flow of liquid to or from the conduits 4 and 5 is interrupted, and the flow of the liquid from the inlet conduit 6 is also interrupted.

The inlet conduit 6, as heretofore stated, communicates with the annular passageway 12. The flow of liquid from this passageway is effected by the aid of a diametrically opposite port-forming means 59 and 60 (see, particularly, Fig. 3), that are radially slidable in body 15. Port-forming means 59 has a through port 61, and its inner face is in sliding contact with one of the flat faces of slide 36. The port-forming means 59 may, therefore, be in the form of a hollow cylinder directed radially of the axis of movement of the slide 36. In order to provide a seal around this port-forming means, a sealing ring 62 is provided in an annular recess around the port-forming means 59. A backing ring 63 may also be included in this recess.

The port-forming means 60 is similarly arranged on the opposite side of the slide 36. The two port-forming means 59 and 60 are urged inwardly by the aid of a spring member 64, which is of generally semi-circular shape and is disposed within the annular channel formed by the grooves 12 and 17. The ends of the bow spring 64 are apertured for the reception of the reduced ends of the port-forming means 59 and 60.

In order to reduce the sliding friction, the contacting edges of the port-forming means 59 and 60 are made relatively narrow.

As indicated in Fig. 1, corresponding to the neutral position of slide 36, the openings in port means 59 and 60 are closed by the slide 36.

The annular passageway 11 is in communication with diametrically opposite port-forming means 65 and 66 that are yieldingly supported in the same manner as the port-forming means 59 and 60. These port-forming means 65 and 66 extend through the body 15, and are urged against the opposite sides of the slide 36 by the bow spring 67.

In the neutral position of Fig. 1, the ports through the port-forming means 65 and 66 are closed by the slide 36.

Port-forming means 68 and 69, similar to means 65 and 66, extend through body 15 and are in communication with the passage 13. In the neutral position of Fig. 1, the ports extending through means 68 and 69 are closed by the slide 36. These port-forming means 68 and 69 may be constructed in substantially the same way as the port-forming means 59, 60, 65, and 66, and are urged resiliently against slide 36 by the bow spring 70.

Figure 4:
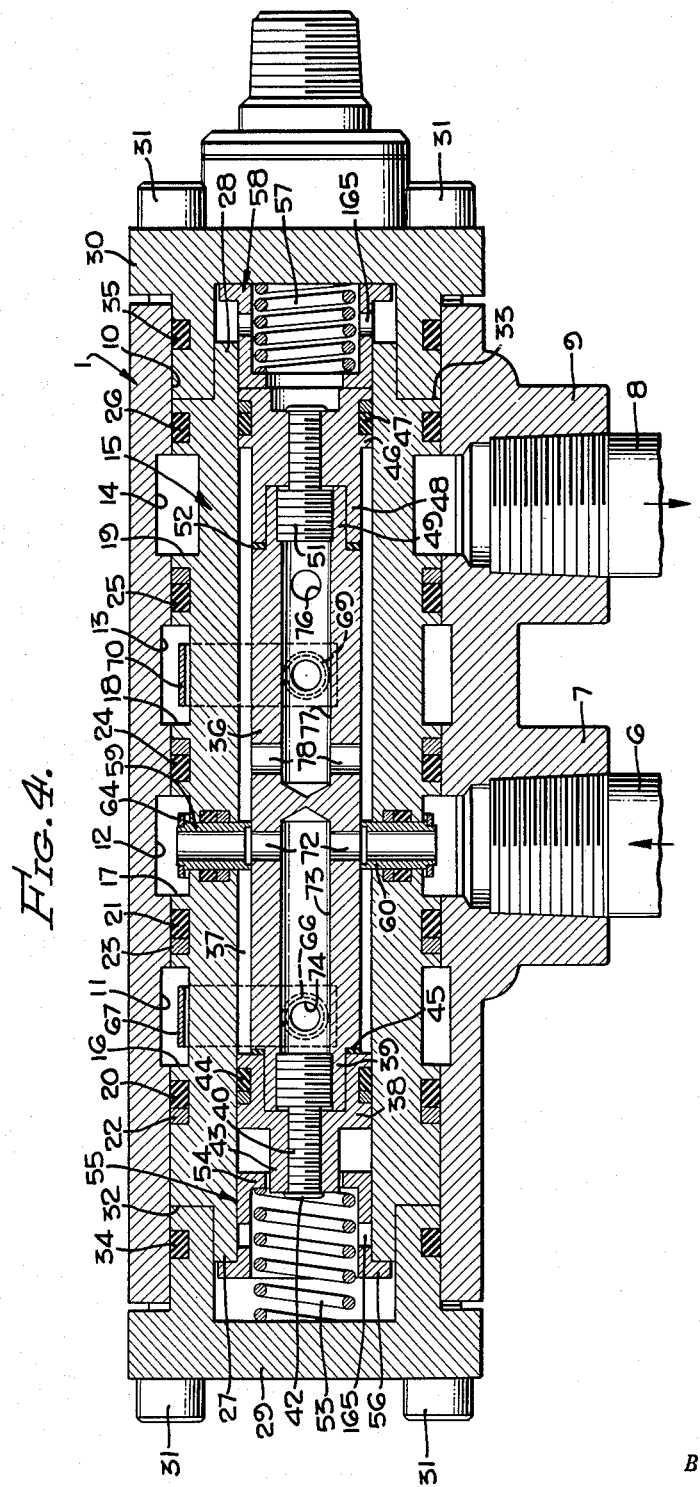
Fig. 4 is a horizontal section, taken along a plane corresponding to the line 4—4 of Fig. 2.

Exhaust conduit 8, as shown most clearly in Fig. 4, is in communication with the annular passageway 14. This annular passageway 14 is, in turn, in communication with the chamber 37, as by the aid of a plurality of ports 71.

By moving the slide 36 to the right or left, the liquid medium is permitted to flow to conduit 4 or conduit 5 from the inlet conduit 6; and the other conduit 5 or 4 is connected to the exhaust conduit 8.

Figure 2:
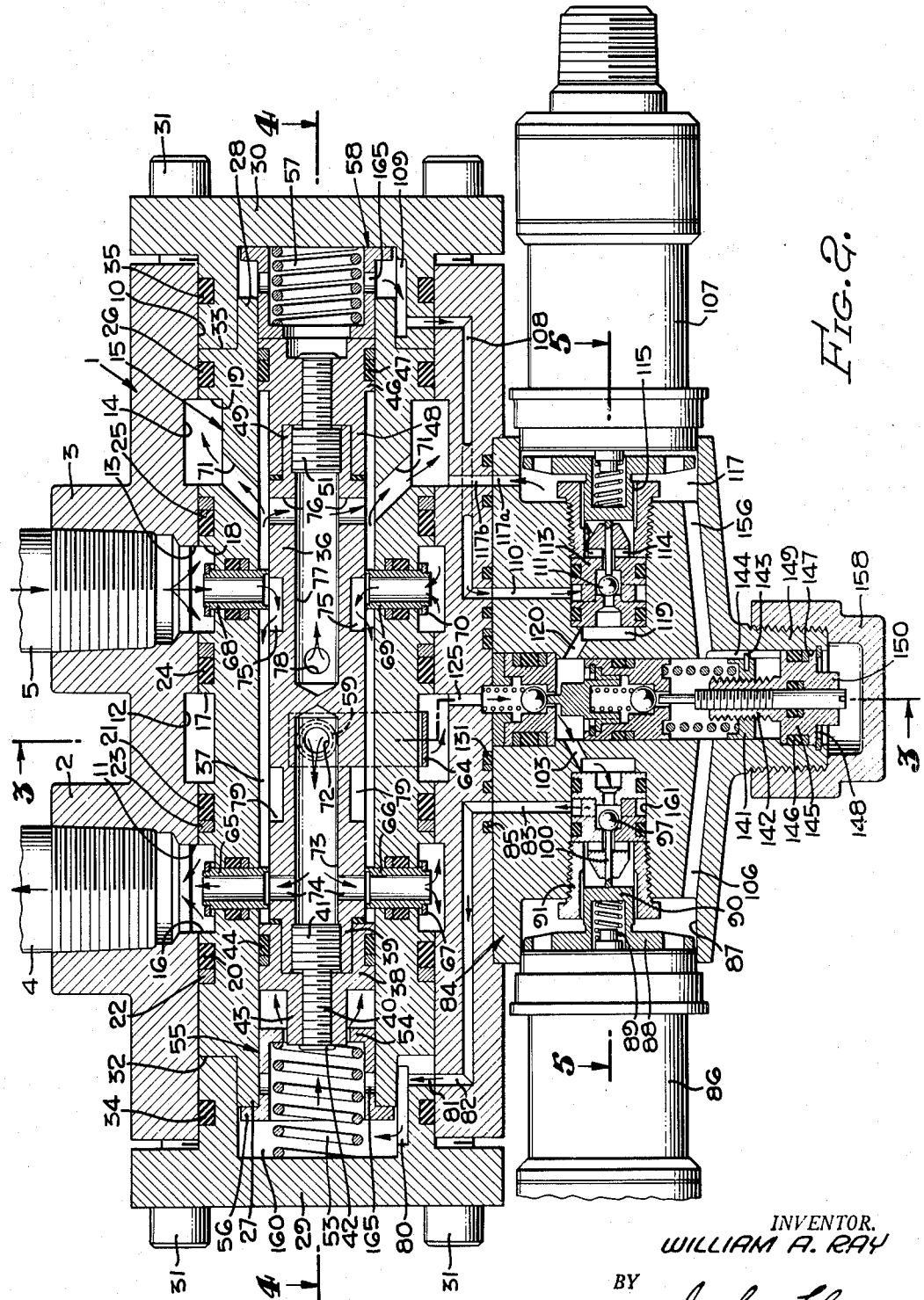
Fig. 2 is a view similar to Fig. 1, but with the slide shown in a different operating position.

In Figs. 2 and 4, the slide 36 is indicated as having moved to the right as far as it is permitted by the flange of spring cage 58. In this position, the means 59 and 60 is placed in communication with transverse ports 72 in slide 36. These ports communicate with the central port 73 which, in turn, communicates with the transverse ports 74 that are now aligned with the port-forming means 65 and 66. Liquid under pressure therefore can flow through these ports into the first cylinder through conduit 4.

In this position, the conduit 5 is in communication with the exhaust conduit 8 through annular passageway 13, port-forming means 68 and 69, recesses 75 on opposite sides of the slide 36, chamber 37, ports 71, annular passageway 14 and exhaust conduit 8.

Obviously, when the slide 36 is moved from the neutral position of Fig. 1 to the left, as far as permitted by the flange 56 of the spring cage 55, the connections will be reversed. Under such circumstances, the port means 68 and 69 are in communication with the transverse ports 76, longitudinal port 77, transverse ports 78, and port means 59 and 60 to the inlet conduit 6. At the same time, the conduit 4 is connected through port means 65, 66, recesses 79, chamber 37, ports 71, and annular passageway 14 with the exhaust conduit 8.

In the intermediate or neutral position of Fig. 1, the oil or other liquid medium is trapped in both of the cylinders connected to conduits 4 and 5. In either of the two extreme positions of the slide 36, one of the two cylinders is exhausted and the other is connected to the source of liquid.

Since two port-forming means are provided for the control of flow of liquid to the annular passageways 11, 12, and 13, the pressures acting upon opposite sides of the slide 36 are neutralized when the slide is in the closed position of Fig. 1.

Liquid pressure derived from the inlet conduit 6 is utilized to urge the slide 36 in either of its extreme right- and left-hand positions. It is for this purpose that the pistons 38 and 46 are provided, operating in cylinder spaces defined by heads 29 and 30.

Since the control valve arrangement for moving the slide toward the left is the same as the control valve arrangement for moving the slide to the right, it is necessary to describe only one of these structures.

Thus, communicating with the space 160 to the left of piston 38, there is a port 80, formed as a groove in this cylinder wall. This port, in turn, communicates with a port 81 extending radially of the head 29. This port 81 communicates with the port 82 extending in the housing 1. This port 82 in turn communicates with a port 83 formed in a control mechanism housing 84. This housing 84 is accommodated in a groove in the lower portion of the housing 1, as viewed in Figs. 1 and 2. As shown most clearly in Fig. 3, this housing is attached to the lower side of housing 1 by the cap screws 121.

An O-ring 85 is formed in a groove surrounding the outlet port 82. The port 83 is controlled by an electromagnetically operated pilot valve structure. The electromagnet structure includes an electromagnetic coil in casing 86, the right-hand end of which projects into a recess 87 formed in the housing 84. A disc armature 88 is arranged to be moved toward the left when the electromagnet is energized. A light compression spring 89 is used to urge the armature 88 to its unenergized position.

The armature 88 is provided with a cylindrical guiding extension 90, freely slidable in a sleeve 91 that has an external tapered thread. The inner end of this sleeve 91 (Fig. 5), urges the two cages 92 and 93 against a shoulder 94 in the housing 84. These two cage members 92 and 93 are provided with resilient sealing rings 95 and 96, which cooperate with a bore 161 in housing 84. The cage members 92 and 93 are spaced apart by an interrupted flange 98 attached to the cage member 92. The cage member 93 has a central port 99 that is adapted to be closed by the ball 97 when the electromagnet 86 is deenergized. This seating is accomplished by the force of the spring 89, urging the armature extension 90 toward the right.

This armature extension carries a stem 100 guided in the boss 101 formed on the cage member 92.

Figure 5:
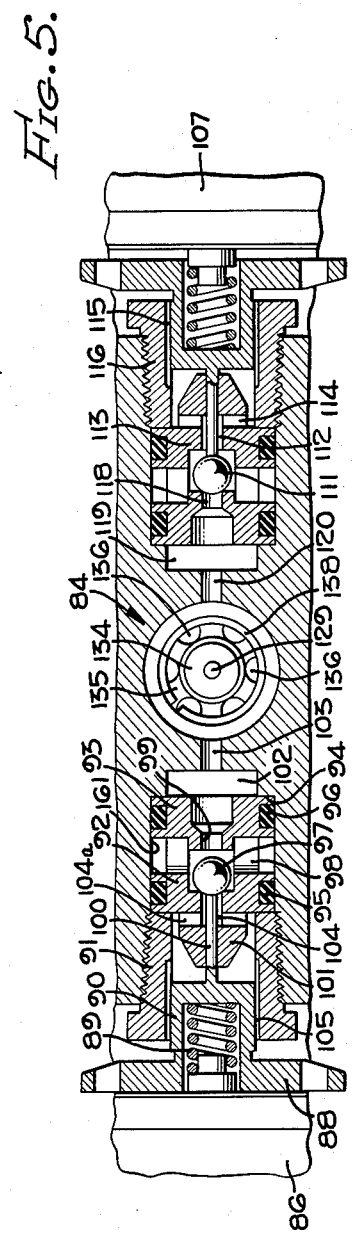
Fig. 5 is an enlarged horizontal fragmentary sectional view, taken along a plane corresponding to line 5—5 of Fig. 2.

The port 83 leads to bore 161, and is in communication with the interior of the interrupted flange 98. Accordingly, when the ball 97 is unseated, as shown in Fig. 5, port 83 is in communication with port 99. This port 99 leads to a chamber 102 and port 103 that is supplied with the liquid medium from inlet conduit 6, in a manner to be hereinafter described.

When the electromagnet 86 is deenergized, the ball 97 is seated around the edge of port 99 and, accordingly, the supply of liquid from the inlet conduit 6 is interrupted. In this position, however, the port 83 communicates through opening 104, around stem 100, and ports 104a to the interior of the sleeve 91. Groove ports 105, formed in the interior of the sleeve connect this space with the recess 87. This recess 87 is in communication with a port 106 that leads to the exhaust annular passageway 14 in a manner to be hereinafter described.

Accordingly, in the neutral position of Fig. 1, the space to the left of cylinder 38 is connected to the exhaust conduit 8.

The control of the passage of liquid to the right of the piston 46 is similarly affected by an electromagnet structure 107, of identical construction, and located at the right-hand side of the housing 84. This electromagnet structure 107 controls the flow of liquid under pressure through a port 108 that leads to the groove port 109 communicating with the cylinder space in head 30.

Thus, the port 108 communicates with a port 110 in housing 84. This port 110 corresponds to port 83. The position of the ball closure member 111 determines whether this port 110 be in communication with the inlet conduit 6 or the exhaust conduit 8. In the neutral position shown, this port 110 is in communication with exhaust conduit 8 through the port 112 in cage 113, transverse ports 114, grooves 115 in sleeve 116, recess 117, and ports 117a and 117b to the exhaust passageway 14.

Accordingly, in the neutral position of Fig. 1, both cylindrical spaces at the ends of slide 36 are connected to the exhaust conduit 8.

When electromagnet 107 is energized, ball 111 is moved to the right and uncovers port 118. This port 118 is in communication, by way of chamber 119, with a port 120 leading to the inlet conduit 6, as will be hereinafter described.

When the electromagnet 86 is energized, the cage 58 at the right of slide 36 moves up to the end wall of head 30. In this movement, a port 165 in the cage is uncovered, to permit flow of liquid out of the cage even when contact is made with head 30. Similar port 165, serving the same purpose on leftward movement of slide 36, is provided in cage 55.

It is thus apparent that, by energizing either one or the other of electromagnets 86 and 107, the slide 36 can be moved by liquid pressure toward the right or toward the left in order to provide the control functions hereinabove described.

Figure 3:
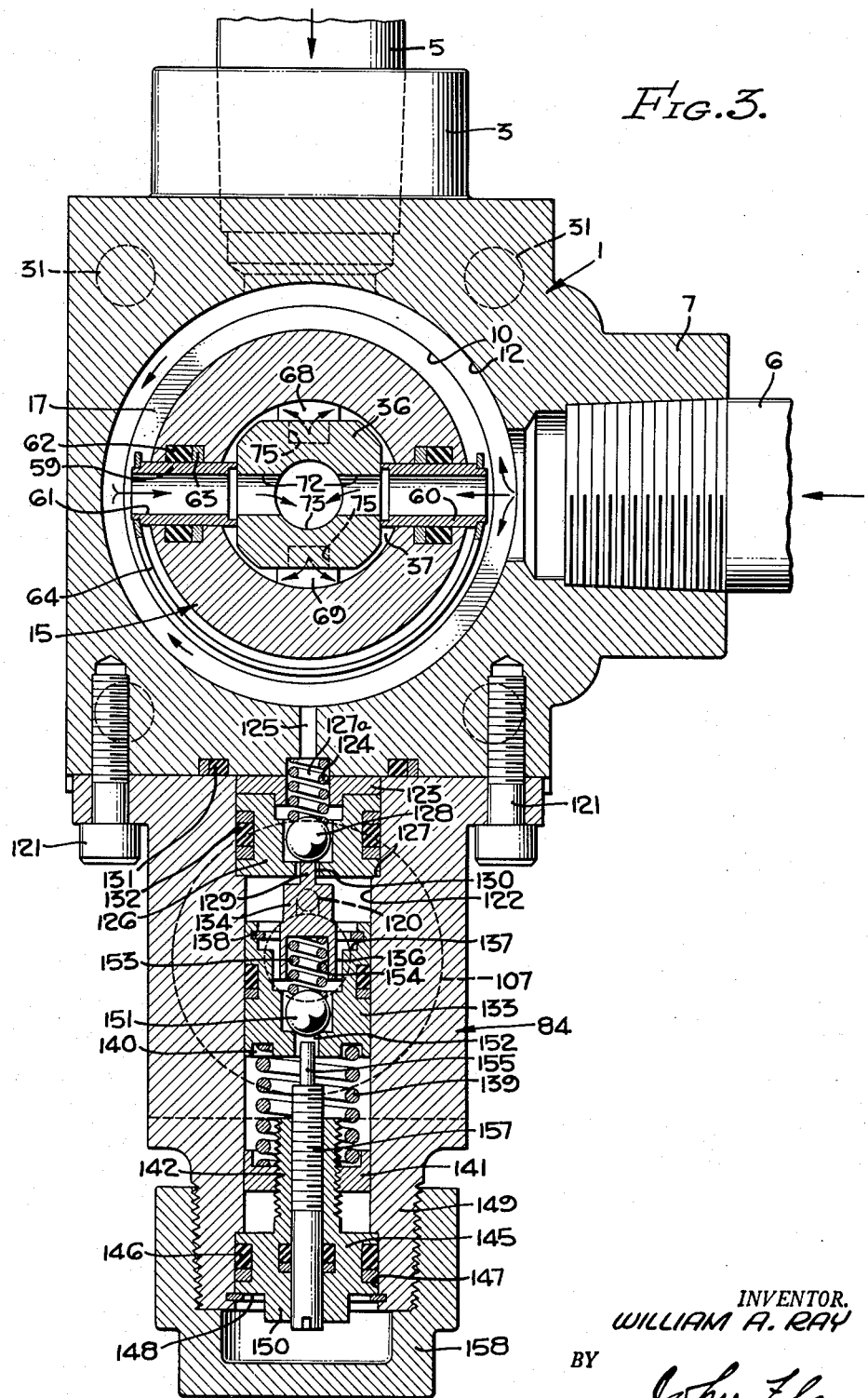
Fig. 3 is an enlarged vertical section, taken along a plane corresponding to line 3—3 of Fig. 2.

The manner in which liquid under reduced pressure is supplied to the chambers 102 and 119, through ports 103 and 120, can be best described in connection with Fig. 3.

A bore 122 extends downwardly through the housing 84, and is in communication with the ports 103 and 120. The upper end of the bore is closed by a disc 123 having a central aperture 124 communicating with a port 125. This port 125 is in direct communication with the annular passageway 12 into which the inlet conduit 6 leads.

Disc 123 is disposed on top of a ball cage 126. The lower end of this ball cage rests on a shoulder 127 formed in the bore 122. A spring 127a in the port opening 124 urges a ball valve 128 downwardly against a stem 129. This stem is urged resiliently against ball 128, in a manner to be hereinafter described. Liquid from the inlet must, accordingly, find its path into bore 122 by way of the restricted passageway between the bottom of the ball closure 128 and an annular space 130. This annular space 130 is formed between the stem 129 and the aperture in the bottom of the cage 126.

The greater the pressure of liquid entering the cage 126, the further will the stem 129 be depressed against spring pressure, as hereinafter described, and the more restricted does this passageway become. Accordingly, the pressure of the liquid entering the bore 122 is correspondingly reduced due to the constricted opening.

Since liquid pressure utilized for operating the cylinders connected to conduits 4 and 5 is of the order of three to five thousand pounds per square inch, there is a considerable reduction in pressure at this point for making it feasible to control the slide 36.

In order to provide an effective seal around these ports, a sealing ring 131 is disposed in a groove around the port 124. A similar sealing ring 132 is disposed around an annular groove of the case 126.

Stem 129, that is engaged by the ball 128, is carried by a slide or piston 133 that fits slidably with the bore 122.

Thus, the stem 129 is formed as an integral part of a cylindrical member 134 (see, also, Fig. 5). This cylindrical member 134 has an interrupted flange 135 providing spaces 136 for the passage of liquid past the cylindrical portion 134.

The interrupted flange 135 rests upon a shoulder 137 (Fig. 3) on piston 133, and is held in place by a spring ring 138. This spring ring snaps into a groove formed in the upper hollow portion of the slide 133. In this manner, the stem 129 is rigidly joined to the slide 133.

The piston 133 is urged upwardly by a compression spring 139. The upper end of this spring engages a groove 140 in the lower side of the slide 133. Its lower end is accommodated in a flanged disc 141. This disc 141 is in threaded engagement with a stud 142 and, accordingly, the force of the spring urging the stem 129 upwardly against the ball 128 may be adjusted by rotation of the stud 142. Rotation of the disc 141 is prevented by a pin 143 (Figs. 1 and 2), engaging in the slot 144 in the wall of the bore 122.

The stud 142 is joined to a head 145 which has the sealing ring structure 146 engaging the enlarged portion 147 of the bore 122. The upper surface of the head 146 abuts the shoulder formed between the bores 122 and 147. It is held in place by a split spring ring 148 engaging within a groove in the threaded extension 149 of housing 84.

The head 145 is provided with a non-circular extension 150, by the aid of which the stud 142 may be rotated to adjust the position of the disc 141.

In order to ensure against any accidental occurance of extremely high pressures beyond the stem 129 and through control ports, a safety relief valve is incorporated in the pressure reduction mechanism. For this purpose, a ball closure 151 is shown as seated above a port 152 in the lower wall of the slide 133. This ball is urged to seated position by the compression spring 153 that extends into a hollow recess 154 formed in the bottom of the cylindrical member 134. When the pressure acting upon the ball 128 becomes excessive, the spring 139 is sufficiently compressed to bring the ball 151 against a stem 155. Accordingly, the ball 151 is restrained from further movement; and, as the slide 133 is further urged downwardly by the excessive pressure, the ball 151 opens the port 152 and the liquid under pressure can flow into the exhaust port 156 shown in Figs. 1 and 2. This exhaust port 156 communicates with the space 117 and port 117a leading to the annular passageway 14.

The position of the stem 155 is adjustable by mounting it on the upper end of an adjusting screw 157. This adjusting screw is threaded into the stud 142, and has a slotted end for the accommodation of a screwdriver to perform the adjusting process. A threaded cap 158 serves to enclose the head 145 and those parts which extend downwardly therefrom.

The exhaust passage 156, through which the high pressure liquid may be passed to exhaust conduit 8, serves as well to conduct exhaust liquid from the left-hand end of the valve slide 36 via port 106 and bore 102.

Due to the balanced relationship of the pairs of port means 59—60, 65—66, and 68—69, the valve slide 36 is subjected to no unbalanced pressure when the valve is in the neutral position of Fig. 1. By the aid of the pressure reducer shown in Fig. 3, the liquid utilized for the control of the valve slide 36 is at a pressure capable of effective utilization.

The inventor claims:

1. In a slide valve structure: an outer housing; an inner valve body; said body and said housing defining an annular passageway between them; means forming an opening through said housing communicating with said passageway; said body also having a chamber therein; a slide guided for longitudinal movement in said chamber, said slide having on opposite sides thereof a pair of flat substantially parallel surfaces spaced from the walls of said chamber; said slide also having a transverse port opening in said surfaces respectively, said slide also having a passageway in communication with said transverse port; a pair of port-forming members guidingly accommodated in said valve body, each of said movable port-forming members communicating with said annular passageway; said movable port-forming members extending into said chamber and having slide contacting edges, said port forming members being adapted to register with said transverse port on opposite sides of said slide respectively; and an arcuate spring member having arms respectively in engagement with said port-forming members and extending in said passageway for resiliently urging said port-forming members against said slide.

2. In a slide valve structure: a valve body having a longitudinal bore and two outlet passageways, said outlet passageways each comprising a pair of aligned port-forming means opening only on diametrically opposite sides of said bore, and means connecting each pair of port-forming means in parallel; means forming an inlet passageway, comprising a third pair of aligned port-forming means opening only on diametrically opposite sides of said bore, and means connecting said third pair of port-forming means in parallel; and a slide in said bore having surfaces continuously cooperating with said third pair of port-forming means; said slide being movable between two limiting positions in said bore; said slide having a first passageway comprising interconnected ports registering with said third pair of port-forming means and one of said pairs of outlet port-forming means in one limiting position of said slide; said slide having a second passageway separate from said first passageway, and comprising interconnected ports registering with said third pair of port-forming means and the other of said pairs of outlet port-forming means in the other limiting position of said slide.

3. In a slide valve structure: a valve body having a longitudinal bore and two outlet passageways, said outlet passageways each comprising a pair of aligned port-forming means opening only on diametrically opposite sides of said bore, and means connecting each pair of port-forming means in parallel; means forming an inlet passageway, comprising a third pair of aligned port-forming means opening only on diametrically opposite sides of said bore, and means connecting said third pair of port-forming means in parallel; a slide in said bore having surfaces continuously cooperating with said third pair of port-forming means; said slide being movable between two limiting positions in said bore; said slide having a first passageway comprising interconnected ports registering with said third pair of port-forming means and one of said pairs of outlet port-forming means in one limiting position of said slide; said slide having a second passageway separate from said first passageway, and comprising interconnected ports registering with said third pair of port-forming means and the other of said pairs of outlet port-forming means in the other limiting position of said slide; and means forming an exhaust opening communicating with said longitudinal bore; said slide having recesses for opening said one or said other of said pairs of port-forming means according to said other or one limiting position of said slide respectively.

4. In a slide valve structure: a valve body having a longitudinal bore and two outlet passageways, said outlet passageways each comprising a pair of aligned port-forming means opening only on diametrically opposite sides of said bore, and means connecting each pair of port-forming means in parallel; means forming an inlet passageway, comprising a third pair of aligned port-forming means opening only on diametrically opposite sides of said bore, and means connecting said third pair of port-forming means in parallel; a slide in said bore having surfaces continuously cooperating with said third pair of port-forming means; said slide being movable between two limiting positions in said bore; said slide having a first passageway comprising interconnected ports registering with said third pair of port-forming means and one of said pairs of outlet port-forming means in one limiting position of said slide; said slide having a second passageway separate from said first passageway, and comprising interconnected ports registering with said third pair of port-forming means and the other of said pairs of outlet port-forming means in the other limiting position of said slide; means forming an exhaust opening communicating with said longitudinal bore; said slide having recesses for opening said one or said other of said pairs of port-forming means according to said other or one limiting position of said slide respectively; fluid pressure means for moving the slide between said limiting positions; and electromagnetic means for controlling said fluid pressure means.

5. In a slide valve structure: an outer housing; an inner valve body defining a chamber; said body and housing defining an annular passageway between them; means forming a pair of openings through said body on opposite sides of said body, said openings extending between said chamber and said annular passageway; a slide longitudinally movable in said chamber and having a through transverse port opening on opposite sides of said slide, said port being adapted to be placed in communication with said annular passageway; said slide also having a passageway in communication with said port; a pair of movable port-forming means guidingly accommodated in said body openings, said port-forming means contacting opposite sides of said slide and registrable with said slide port upon longitudinal movement of said slide to one position; and an arcuate spring member connecting said port-forming means and extending in the annular passageway, for resiliently urging said port-forming means against the slide.

6. In a valve structure having a body, the body having a longitudinal chamber, a slide movable in the chamber, the slide having passage-forming means including a port extending transversely of the slide, the combination therewith of: means forming an annular space around said valve body; means forming a pair of openings extending through the body and communicating with said chamber on diametrically opposite sides thereof, said openings being in communication with said space; a pair of movable port-forming means guidingly received in the openings respectively, each of said port-forming means having slide contacting surfaces extending into said chamber; and an arcuate spring member in said annular space and engaging said port-forming means for urging said port-forming means against said slide, said movable port-forming means being cooperable with said transverse port of said slide upon movement of said slide to align said transverse port with said port-forming means.

7. In a slide valve structure: a body having a longitudinal chamber, means forming a first port opening in said chamber to provide an inlet opening, means forming a second port opening in said chamber to provide an outlet opening, said body also having means forming a return opening continuously communicating with said chamber throughout substantially the entire length of said chamber; a slide in said chamber having surfaces engageable with said first and second port-forming means, said slide having passage-forming means opening in said surfaces and registering with said ports of said body when said slide is in one position, said slide being movable to a second position to move said slide passageway out of registry with said first body port, said slide having a recess for uncovering said second body port when said slide is moved to said second position; fluid pressure means for moving the slide in either direction; and electromagnetic means for controlling said fluid pressure means.

8. In a slide valve structure: a body having a longitudinal chamber, means forming a first port opening in said chamber to provide an inlet opening, means forming a second port opening in said chamber to provide one outlet opening, means forming a third port opening in said chamber to provide another outlet opening, said body also having means forming a return opening continuously communicating with said chamber throughout substantially the entire length of said chamber; a slide in said chamber having surfaces engageable with said port-forming means of said body, said slide having a first passage-forming means opening in said surfaces and registering with said first and second ports when said slide is in one position, said slide having a second passage-forming means separate from said first passage-forming means opening in said surfaces and registering with said first and third ports when said slide is in a second position, said slide having a recess for uncovering said second port when said slide is in said second position, said slide having a recess for uncovering said third port when said slide is in said first position; fluid pressure means for moving said slide in either direction; and electromagnetic means for controlling said fluid pressure means.

9. In a slide valve structure: a body having a longitudinal chamber, means forming a first port opening in said chamber to provide an inlet opening, means forming a second port opening in said chamber to provide one outlet opening, means forming a third port opening in said chamber to provide another outlet opening, said body also having means forming a return opening continuously communicating with said chamber throughout substantially the entire length of said chamber; a slide in said chamber having surfaces engageable with said port-forming means of said body, said slide having a first passage-forming means opening in said surfaces and registering with said first and second ports when said slide is in one position, said slide having a second passage-forming means separate from said first passage-forming means opening in said surfaces and registering with said first and third ports when said slide is in a second position, said slide having a recess for uncovering said second port when said slide is in said second position, said slide having a recess for uncovering said third port when said slide is in said first position, said slide also being movable to an intermediate position in which said surfaces of said slide close all of said ports; fluid pressure means for moving said slide in either direction; and electromagnetic means for controlling said fluid pressure means.

10. In a slide valve structure: an outer housing; an inner valve body; said body and housing defining a pair of separate axially spaced annular passageways between the body and the housing; means forming an inlet opening through said housing communicating with one of said pair of annular passageways; means forming an outlet opening through said housing communicating with the other of said pair of annular passageways; said body also having a chamber therein; a slide guided for longitudinal movement in said chamber, said slide having flat substantially parallel surfaces spaced from the walls of said chamber; said slide having a pair of axially spaced transverse ports; said slide also having a passageway connecting said transverse ports; a first pair of diametrically oppositely disposed port-forming members guidingly accommodated in said valve body, each of said first pair of port-forming members communicating with said one of said annular passageways, said first pair of port-forming members extending into said chamber and having slide contacting edges; said first pair of port-forming members being in registry with one of said transverse ports of said slide and on opposite sides of said slide respectively when said slide is in one position; a second pair of diametrically oppositely disposed movable port-forming members guidingly accommodated in said valve body, each of said second pair of port-forming members communicating with said other of said annular passageways, said second pair of port-forming members extending into said chamber and having slide contacting edges; said second pair of port-forming members being in registry with the other of said transverse ports of said slide on opposite sides of said slide respectively when said slide is in said one position; a first arcuate spring member having arms respectively in engagement with each of the first pair of port-forming members and extending in said one annular passageway for resiliently urging said first pair of port-forming members against said slide; and a second arcuate spring member having arms respectively in engagement with each of the second pair of port-forming members and extending in said other annular passageway for resiliently urging said second pair of port-forming members against said slide.

References Cited in the file of this patent

UNITED STATES PATENTS

| | | |
|---|---|---|
| 910,163 | Benninghof | Jan. 19, 1909 |
| 1,908,504 | Bone | May 9, 1933 |
| 2,118,779 | Rippl | May 24, 1938 |
| 2,363,111 | Bennett | Nov. 21, 1944 |
| 2,375,255 | Snader | May 8, 1945 |
| 2,394,487 | Rotter | Feb. 5, 1946 |
| 2,396,643 | DeGanahl | Mar. 19, 1946 |
| 2,404,349 | Brant | July 23, 1946 |
| 2,409,517 | Schmit | Oct. 15, 1946 |
| 2,445,781 | Hrdlicka | July 27, 1948 |
| 2,601,990 | Holzer | July 1, 1952 |

FOREIGN PATENTS

| | | |
|---|---|---|
| 548,175 | Great Britain | 1942 |
| 71,248 | Switzerland | June 15, 1915 |